W. RANDALL.

Injector.

Reissued May 4, 1875.

No. 6,414.

Witnesses.
S. N. Piper.
L. N. Müller

William Randall.
by his attorney.
R. H. Eddy

THE GRAPHIC CO. PHOTO-LITH. 39 & 41 PARK PLACE, N.Y.

UNITED STATES PATENT OFFICE.

WILLIAM RANDALL, OF SALEM, MASSACHUSETTS, ASSIGNOR OF ONE-HALF INTEREST TO JOSIAH M. CROCKER.

IMPROVEMENT IN INJECTORS.

Specification forming part of Letters Patent No. 149,414 dated April 7, 1874; reissue No. 6,414, dated May 4, 1875; application filed March 29, 1875.

*To all whom it may concern:*

Be it known that I, WILLIAM RANDALL, of Salem, of the county of Essex and State of Massachusetts, have invented certain new and useful Improvements in Injectors for Boilers; and do hereby declare such to be described as follows, reference being had to the accompanying drawings making part of my specification.

The said invention may be said to consist mainly as follows, viz: In the combination of a nozzle and a T-pipe arranged in manner and to operate as hereinafter specified.

Also, in the nozzle and T-pipe, in combination and communicating with an annular space surrounding the said conical nozzle, by which arrangement the steam and water may be let into the injector from either of two inlets, one of which is in the rear of the aforesaid nozzle, and the other one leads into the annular space surrounding it, as will herein be more fully described.

My invention also consists in an additional water-inlet leading into an annular space surrounding a conical projection, and provided with an overflow-pipe, by which arrangement I am enabled to feed with warm water, which object has heretofore been very difficult to accomplish.

Figure 3:
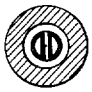
Figure 4:
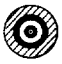
Figure 2:
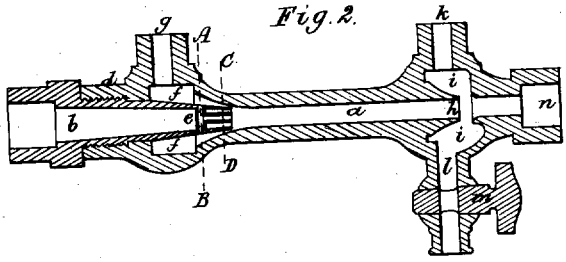
Figure 1:
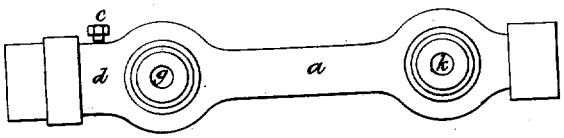

On the drawings, Figure 1 represents a ground plan of my invention. Fig. 2 represents a central longitudinal section of it. Fig. 3 represents a cross-section, taken on the line A B, shown in Fig. 2, and Fig. 4 represents a similar cross-section of it, on the line C D, shown also in Fig. 2.

Similar letters refer to similar parts wherever they occur on the drawings.

*a* represents the conducting-pipe for the steam and water in the ordinary way. In the left end of it, as shown in Fig. 2, is inserted a conical nozzle, *b*, secured to and made adjustable in relation to the body *d* of the injector, by means of a set-screw, *c*, as shown. The end of the nozzle *b* is provided with a T-pipe, *e*, arranged as shown in Fig. 2, and consisting not only of a lateral pipe in open communication with the annular chamber *f*, that surrounds the nozzle *b*, but of a central pipe leading from the aforesaid lateral pipe to the conductor *a*. From or into the chamber *f* leads a pipe, *g*, as shown in Fig. 2. The said chamber *f* also is in open communication with the conductor *a*, by means of an annular space around the end of the nozzle *b*, and constituting a continuation of the conductor *a*, as shown. The object of this construction is that I may introduce the steam and feed water, one or the other, through either of the pipes *b* or *g*, as may be desirable, under different circumstances.

Should the steam be forced through the nozzle *b*, and the feed-water be allowed to enter the chamber *f*, through the pipe *g*, a part of the feed-water will pass through the T-pipe *e*, and be drawn with the steam partly through the annular space that surrounds the end of the nozzle *b*, and partly through the central part of the aforesaid T-pipe, by which a very close and intimate contact between the steam and feed-water will be obtained, by which the effect of the injector will be materially increased. By forcing the steam from the pipe *g* into the annular space *f*, and T-pipe *e*, and allowing the feed-water to enter the conical nozzle *b*, a similar and intimate contact between the steam and feed-water will be effected, as in this case the steam will be forced into the conductor *a*, partly through the annular space surrounding the end of the nozzle *b*, and partly through the T-pipe *e*, whereas the feed-water will be drawn into the said conductor *a* from the annular space that surrounds the central part of the aforesaid T-pipe *e*.

Thus it will be seen that the steam and feed-water can be allowed to enter through either of the openings *b* or *g*, as may be most desirable, according to different circumstances and location of the injector. The conductor *a* terminates to the right, as seen Fig. 2, in an additional nozzle, *h*, leading into an annular chamber, *i*, provided with three outlets, viz, *k*, for the admittance of the heated feed-water *l*, with its valve or stop-cock *m* for the overflow in the usual way, and *n* a feed-pipe to the boiler. The object of this arrangement is to be able to feed partly with heated water, which it has heretofore been difficult to accomplish.

When I use the feed-pipe *h* for feeding heated water, I must, of necessity, allow some cold water to be fed with the steam, either through the nozzle *b* or the induct *g*, in order to obtain a partial condensation of the steam before it may come in contact with the heated water at *k*. Between the openings *b*, *g*, *k*, and *n*, and the boiler and water-tanks must necessarily be used stop-cocks, valves, check-valves, or their equivalents, which are not shown in the drawings, as they are well known and in use on all injectors and feeding apparatus of this kind.

Having thus described the nature, construction, and operation of my invention, what I claim as such may be stated as follows:

1. The combination of the nozzle *b* and the T-pipe *e*, arranged in manner and to operate substantially as specified.

2. The combination of the nozzle *b* and its T-pipe *e*, with the annular chamber *f* and the pipe or induct *g*, all being arranged substantially as explained and represented.

3. The combination of the nozzle *b*, annular chamber *f*, and the pipe or induct *g*, with the nozzle *h*, annular chamber *i*, feed-pipe or induct *k*, and the delivery-pipe *n*, all being arranged and applied substantially as specified and shown.

4. The combination of the discharge-pipe *l*, and stop-valve *m*, the nozzle *h*, annular chamber *i*, induct *k*, educt *n*, conduit *a*, nozzle *b*, annular chamber *f*, and induct *g*, all being arranged and applied substantially as shown and described.

WILLIAM RANDALL.

Witnesses:
R. H. EDDY,
J. R. SNOW.